J. W. MOAKLER.
REMOVABLE RESILIENT CORE FOR TIRES.
APPLICATION FILED JUNE 9, 1916.
1,228,346.
Patented May 29, 1917.
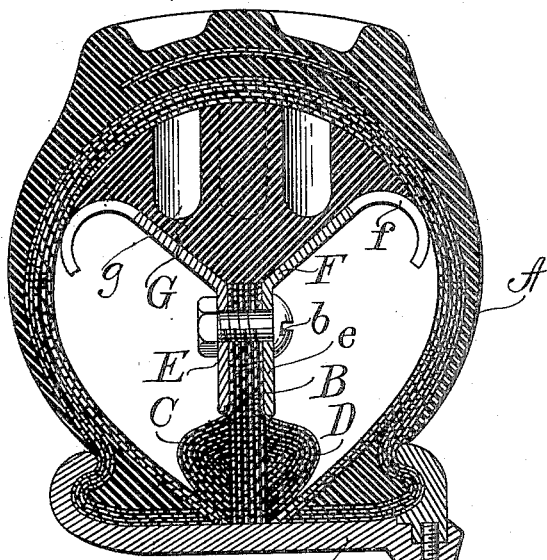
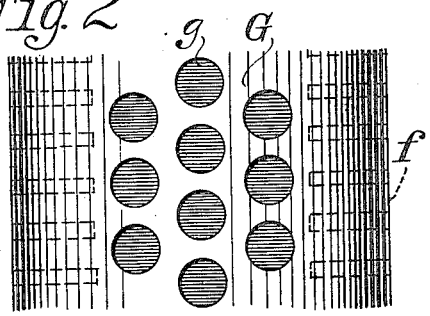
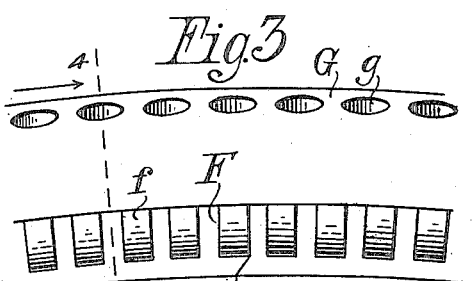
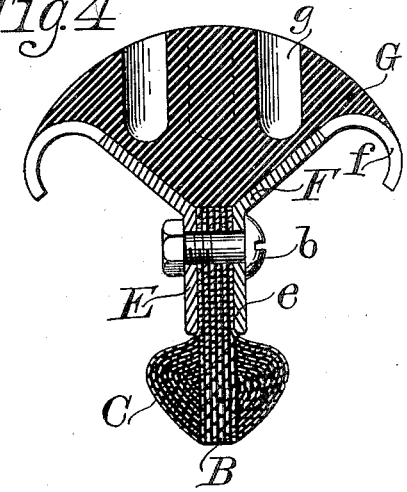
Inventor
John W. Moakler,
By Edwin Guthrie,
Attorney

UNITED STATES PATENT OFFICE.

JOHN WM. MOAKLER, OF EAST WORCESTER, NEW YORK, ASSIGNOR OF ONE-HALF TO NOAH S. WRIGHT, OF EAST WORCESTER, NEW YORK.

REMOVABLE RESILIENT CORE FOR TIRES.

1,228,346.  Specification of Letters Patent.  Patented May 29, 1917.

Application filed June 9, 1916. Serial No. 102,684.

*To all whom it may concern:*

Be it known that I, JOHN W. MOAKLER, a citizen of the United States, residing at East Worcester, in the county of Otsego and State of New York, have invented certain new and useful Improvements in Removable Resilient Cores for Tires, of which the following is a specification.

This invention relates to removable resilient cores for automobile tires, and the object of the invention is the production of a removable inner filling or support for the ordinary outer rubber tire casing that will take the place of the inner pneumatic tube for all practical purposes, affording it is believed unusual resiliency and wear. This invention consists in the form, the special construction and arrangement of parts hereinafter illustrated and described.

Of the accompanying drawings Figure 1 represents an outer tire casing of ordinary construction to which this invention has been interiorly applied, the whole being shown in cross-section. Fig. 2 is a top plan view of a portion of the outer surface of the rubber cushion, showing the arrangement of the open chambers or cavities therein. Fig. 3 is a side view of a portion of a core constructed in accordance with this invention. Fig. 4 is a view in cross-section of this invention removed from the tire casing. The section shown in Fig. 4 is taken on the broken line 4—4 of Fig. 3.

Throughout the drawings and description the same letter is used to refer to the same part.

Considering the drawings, the tire casing A in the demountable rim a, is supported and distended by means of this invention, which comprises the vertical web B formed usually of canvas and rubber fabric, and having on each side at its inner edge the protuberant portions C and D made of like material, and forming together with the inner edge of the web a wedge-shaped termination located between the inner edges of the tire casing A as best shown in Fig. 1, and serving to keep the beads of the tire casing in the grooves of the rim a. It is thought to be clear that pressure upon the tread of the tire forces the wedge-shaped termination described more strongly against the rim and between the beads of the tire casing.

Above the protuberances C and D, and arranged upon opposite sides of the web B are side plates comprising the vertical portions E and e, and each plate having portions inclined upwardly and outwardly with respect to the vertical portions of the plates. The inclined portion forming the continuation of the vertical portion e of the plate shown on the right of the web B in Figs. 1 and 4 is marked F. The edge of the portion F of the side plate is resilient, and the spring effect is ordinarily accomplished in practice by providing the edge with a series of spaced spring fingers f. It will be understood that there are two side plates, one on either side of the web B, and that these plates are alike in all respects, and that each plate has a series of spaced spring fingers formed on its upper and outer edge. The plates are secured to the web by bolts b passing through them and through the web.

It will be observed in Figs. 1 and 4, that the side plates in conjunction with the web form a Y-shaped structure, and within the Y-shaped structure is located a relatively yielding rubber cushion G, the outer surface of which is curved and provided with a series of chambers or cavities g, the chambers opening at the outer curved surface of the cushion mentioned. It is not the intention of this description to limit this invention to the precise form or staggered arrangement of the chambers g illustrated.

When the parts of this invention are all assembled they constitute an annular core having a cross-section as set out in Fig. 4 and a side view as shown in Fig. 3, and in operation the core thus formed is placed within a tire casing such as the tire casing A. The tire casing covers the openings and confines a body of air in the chambers or cavities g. It will be understood, therefore, that the resiliency of the core made in accordance with this invention is made up of three different elastic actions, that of the rubber cushion itself, that of the compression of the air within the chambers g, and that of the spring edge portions of the side plates. There may be any number of side plates employed. In practice there are usually six on each side of the web B.

It is not intended in this description to limit the thickness or length of the web B, or the extent to which the side edges of the side plates may be rendered resilient.

Having now described this invention and explained the mode of its operation, what I claim is:—

1. In a resilient core for tires, the combination with a vertical web, of side plates each having a vertical portion and an upwardly and outwardly inclined portion having a resilient edge, the said plates being secured upon opposite sides of the said web forming a Y-shaped structure, and a rubber cushion fitting the said Y-shaped structure and having a curving outer surface.

2. In a resilient core for tires, the combination with a vertical web, of side plates each having a vertical portion and an upwardly and outwardly inclined portion having at the edge a series of spaced and inwardly curved resilient fingers, the said plates being secured upon opposite sides of the said web forming a Y-shaped structure, and a rubber cushion fitting the said Y-shaped structure and having a curving outer surface.

3. In a resilient core for tires, the combination with a vertical web, of side plates each having a vertical portion and an upwardly and outwardly inclined portion having a resilient edge, the said plates being secured upon the opposite sides of the said web forming a Y-shaped structure, and a rubber cushion fitting the said Y-shaped structure, the said cushion having a plurality of chambers therein and a curving outer surface.

4. In a resilient core for tires, the combination with a vertical web, of side plates each having a vertical portion and an upwardly and outwardly inclined portion having a resilient edge, the said plates being secured upon opposite sides of the said web forming a Y-shaped structure, and a rubber cushion fitting the said Y-shaped structure and having an outer curving surface, the said cushion having a plurality of chambers opening outwardly at the said curved surface of the cushion.

In testimony whereof I affix my signature.

JOHN WM. MOAKLER.